Dec. 4, 1934.  A. JENSEN  1,983,173

PRESSURE CIRCULATOR AND SCALDER

Filed Sept. 30, 1930   2 Sheets-Sheet 2

INVENTOR.
Aage Jensen.
BY Townsend, Loftus & Abbett
ATTORNEYS.

Patented Dec. 4, 1934

1,983,173

UNITED STATES PATENT OFFICE 1,983,173

PRESSURE CIRCULATOR AND SCALDER

Aage Jensen, Los Angeles, Calif.

Application September 30, 1930, Serial No. 485,409

2 Claims. (Cl. 126—370)

This invention pertains to a pressure circulator and scalder, and more particularly to a device for providing a positive flow of water or heating medium of uniform temperature to a food-processing apparatus or the like.

Fluid circulating devices for use in dairies and food manufacturing plants are coming into greater demand as the theory of heating with water of predetermined temperature is becoming better understood. In the manufacture, for instance, of dairy products involving heating of milk or cream to pasteurizing or sterilizing temperatures, it is a common practice to inject steam into the heating water direct and to rely on the thermosiphonic action of the same to make the required surface contact for the transfer of heat. Other devices depend upon the steam jet method to force movement on the heating medium, as well as imparting heat to the same.

Another method commonly used is to force circulation by use of a pump, the preheated medium being contained in an atmospheric tank, and to return the medium at a reduced temperature to the tank for reheating. Then, again, steam is often applied direct into a confined space, or jacket, and the heat transfer is made through surface radiation. It has been observed that great variations in the efficiency of heat transfer exist in all of the above-named methods.

Experiments have proven that a solid body of preheated water liberates its heating energy faster than steam. Further advantages such as the following have been proven:

There is a definite relation between the ability of the water to give off its heating energy and the motion and surface contact of the same. There is less precipitation of organic solids on the heating surfaces when water is used as a heating medium instead of steam, even though the same relative temperatures prevail. The thermosiphonic motion naturally set up in water is too slow to insure the necessary speed in the transfer of heat energy. The jet principle of heating and for creating circulation as described above is both slow and limited in that the sudden expansion of the jet-heated water as it approaches the boiling temperature causes jet-induced circulation to stop. Forced circulation of water preheated in a tank under atmospheric pressure using steam, is limited to a temperature several degrees below that of the boiling temperature of the water. Mechanically operated circulating devices of closed design, where returned water is discharged into the same compartment in which the steam used for heating also enters, causes a forced action of condensing which immediately reflects on the outgoing temperature.

It is therefore the object of the present invention to overcome the disadvantages set forth above and to generally improve upon pressure circulators used in food processing and continuous pressure heaters, and particularly upon the type adapted to be used in connection with dairy machinery and the like.

It has been satisfactorily demonstrated with the machine to be described hereinafter, that water circulated through the heating jacket of a high speed drum pasteurizer could be brought to a temperature as high as 240° F. with forced circulation under a corresponding pressure control, without any outward or unfavorable symptoms other than those which would ordinarily be present during the circulation of cold or merely warm water. The heat transfer efficiency of the pasteurizer was increased fully one hundred per cent. over and above any former record available wherein a similar device had been used where a forced circulation was not used, but where the thermo-simphonic principle was employed.

A better understanding of my invention may be had from the accompanying drawings and the following specification, in which a preferred form thereof is illustrated and described.

Figure 3:
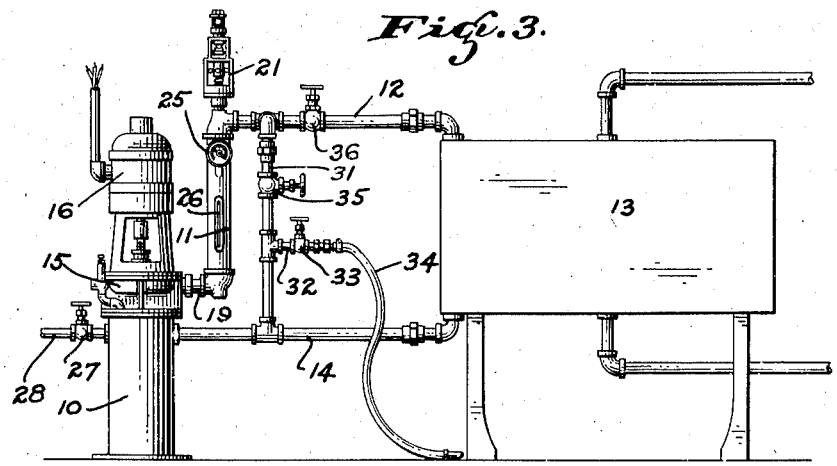
Fig. 3 is a view showing the pressure circulator as it may be connected to a pasteurizer or the like, and showing the arrangement of by-pass connections for using the circulator as a scalder.

Referring more particularly to the drawings, I show a vertically disposed surge chamber 10 which is in communication with a heating chamber 11. A discharge pipe 12 leads from the upper end of the heating chamber 11 to any form of processing apparatus with which the device is to be used. A processing apparatus is indicated at 13 in Fig. 3. A return line 14 forms a direct communication between the processing apparatus 13 and the surge chamber 10. A centrifugal pump 15 is disposed above the surge chamber 10 and driven by a motor 16, also disposed thereabove. The advantages presented by this vertical arrangement of the surge chamber and pumping unit are several-fold. For instance, the floor space required is very much smaller than in devices where the horizontal type pump is employed, the power transmission, being elevated, is protected from floor splash, no side strains are exerted on the bearings and packing of the pump by the weight of moving parts, and the introduction of sound thermo-siphonic principles is greatly facilitated.

The suction or intake pipe 17 of the pump 15 extends downwardly to the bottom of the surge chamber so as to insure constant priming of the pump, and terminates in a strainer as indicated at 18. This positioning of the intake of the pump also provides substantial space above its intake within the surge chamber to permit the separation of return gases from the heating medium. The discharge outlet 19 of the pump 15 is connected to the relatively small heating chamber 11.

Figure 1:
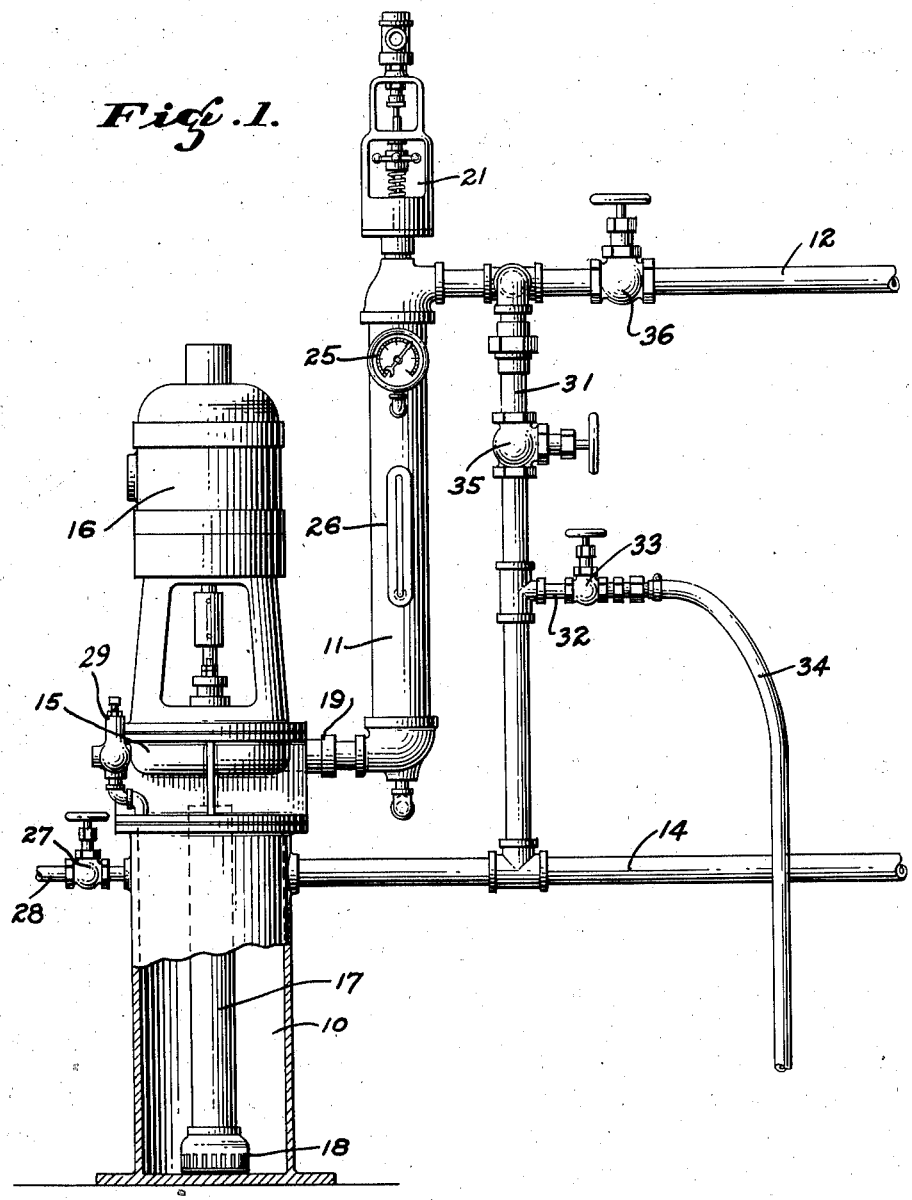
Fig. 1 is a front elevation with parts broken away, of a pressure circulator embodying my invention.
Figure 2:
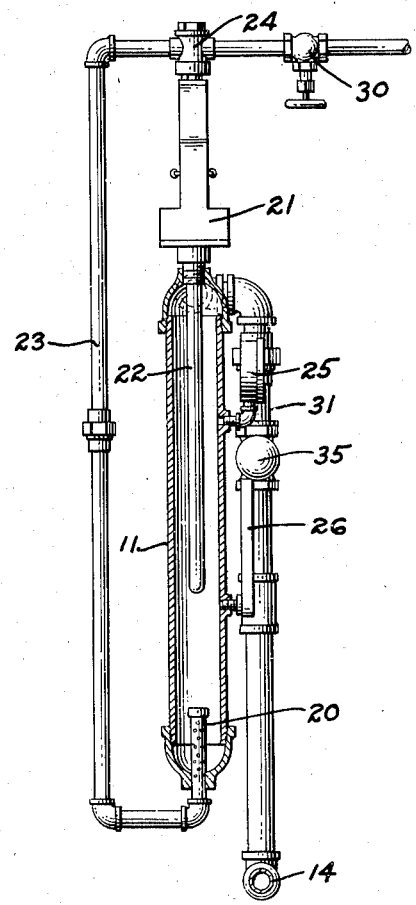
Fig. 2 is a side elevation of the heating chamber shown in Fig. 1, with parts shown in section.

A perforated steam nozzle 20, such as shown in Fig. 2, extends upwardly into the bottom of the heating chamber, and a suitable temperature-controlling device 21 is positioned on top thereof. A thermo-sensitive bulb 22 carried by the temperature-controlling device 21 extends downwardly into the chamber, terminating well above the steam nozzle 20. A steam supply pipe 23, which supplies steam under pressure to the nozzle 20, is connected to a control valve 24 which is regulated by the temperature-control device 21 according to the temperature of the fluid within the heating chamber 11.

A pressure gauge 25 and an indicating thermometer 26 are provided on the exterior of the heating chamber 11 for the purpose of visual observation.

A priming valve 27 controls the flow of water from the source of supply through the pipe 28 leading into the surge chamber 10. A relief valve 29 of any suitable type is in communication with the extreme top of the surge chamber and is of such a design that it may be regulated as to pressure in order that the heating medium may be maintained at a temperature above that of boiling water at atmospheric pressure. This valve should also be of a type that will permit the escape of either accumulated water or gas when the pressure within the surge chamber becomes excessive.

The operation of the device as described so far is as follows:

The priming valve 27 is opened to permit water to flow into the surge chamber 10. When the required amount of water has entered the chamber the motor 16 is energized and drives the pump 15. The water in the surge chamber is then drawn through the intake 17 by the pump and is discharged through the outlet connection 19 and into the heating chamber 11. At this point steam is introduced to the nozzle 20 by the opening of a suitable valve such as indicated at 30 in Fig. 2, through the pipe 23. The steam thus introduced to the heating chamber 11 transfers heat to the water and the pump forces the heated water through the pipe 12 into and through the processing apparatus 13, from which it returns to the surge chamber by means of the pipe 14. The temperature of the water is maintained constant by the temperature-regulating device 21, and in case of excessive pressure in any part of the system, the relief valve 29 functions in the usual manner.

A further advantage of my invention lies in the fact that it is provided with a special connection for using heated water for scalding or scouring purposes. This connection consists of a valve-controlled by-pass indicated at 31, which forms a connection between the discharge pipe 12 and the return line 14. A branch outlet 32, through which the flow of water is controlled by a valve 33, leads to a suitable scalding hose 34 through which scalding water may be passed under pressure for surface cleaning in and about the machinery of the plant. The by-pass 31 is controlled by a valve 35 and a valve 36, the latter being positioned in the discharge pipe 12. During the use of the machine as a pressure-circulator as described above, the valve 35 is closed and the valve 36 is open. When it is desired to use the circulator for supplying hot water for cleaning purposes, the valve 36 is closed and the valve 35 is open; thus, water circulated by the pump 15 and heated in the chamber 11, instead of passing through the processing apparatus, as described, passes through the by-pass pipe 31 and may be discharged through the hose 34 upon opening of the valve 33. The priming valve 27 may be allowed to remain open to compensate for the volume of water leaving the system through the hose 34.

Among the outstanding advantages of my invention are the positioning of the heating control in the discharge line whereby a given flow of heating medium may be forced at a predetermined, automatically regulated temperature to the processing apparatus and returned to the suction side of the pump at a reduced temperature after the transfer of heat in the processing apparatus.

A further advantage resides in the positioning of the pump intake at the lower portion of the surge chamber, whereby the air or gas that might accumulate in the upper portion of the chamber is prevented from being circulated through the system.

A further advantage comes from the relative size of the heating chamber to the liquid flow including the steam nozzle. This feature is reflected in quick acceleration and in imparting the heating medium to circulating medium.

While I have shown a preferred form of my invention, and described the same more or less specifically, it should be understood that various changes may be resorted to in the construction and arrangement of the several parts without departing from the spirit and scope of the appended claims.

Having thus described my invention, what I claim and desire to secure by Letters Patent is:

1. In a circulating heating means of the character described, a surge chamber adapted to contain a heating liquid, pump means above said surge chamber adapted to pump the liquid from the lower part of said surge chamber, a heating chamber adapted to receive said liquid from said pump, a heat treatment means, a conduit connecting the outlet of said heating chamber with said treatment means, a conduit connecting said treatment means with said surge chamber at a point substantially above the bottom thereof, a valve in said first-mentioned conduit, a by-pass connecting said first-mentioned conduit at a point between said heating means and said valve with said second conduit, a valve in said by-pass, a valved outlet in said by-pass, a priming conduit connected with said surge chamber at a point substantially above the bottom thereof, a priming valve in said priming conduit, a steam nozzle in said heating chamber for supplying steam heat to the liquid therein, and thermo-sensitive means operable by the temperature of the liquid to control the flow of steam to said nozzle.

2. A combined scalder and pressure circulator for providing a circulation of hot water through a processing apparatus and for withdrawing hot water under pressure from said circulation, comprising an upright surge chamber having a greater height than diameter, a pump centrally above said surge chamber and having a diameter not greater than that of said surge chamber, the intake end of said pump being at the lower end of said surge chamber, a heating chamber having a greater height than diameter, the outlet end of said pump being connected to the bottom of said heating chamber, means to introduce steam at the lower part of said heating chamber, a thermostatic element in said heating chamber above the lower end thereof, means actuated by said thermostatic element to control the flow of steam into said heating chamber, a heat processing means, a conduit connecting the upper part of said heating chamber with said heat processing means, a conduit connecting said heat processing means with the upper part of said surge chamber, a by-pass connecting said second mentioned conduit with said first mentioned conduit, a valve in said first mentioned conduit between said by-pass and said heat processing means, a valve in said by-pass, a hot water outlet connected to said by-pass, a conduit connected to said surge chamber, and a relief valve at the upper part of said surge chamber.

AAGE JENSEN.